July 17, 1962 R. J. POULIN 3,044,119
AUTOMATIC INJECTION MOLDING MACHINES
Filed March 12, 1958 4 Sheets-Sheet 1

INVENTOR
Raymond J. Poulin

July 17, 1962 R. J. POULIN 3,044,119
AUTOMATIC INJECTION MOLDING MACHINES
Filed March 12, 1958 4 Sheets-Sheet 2
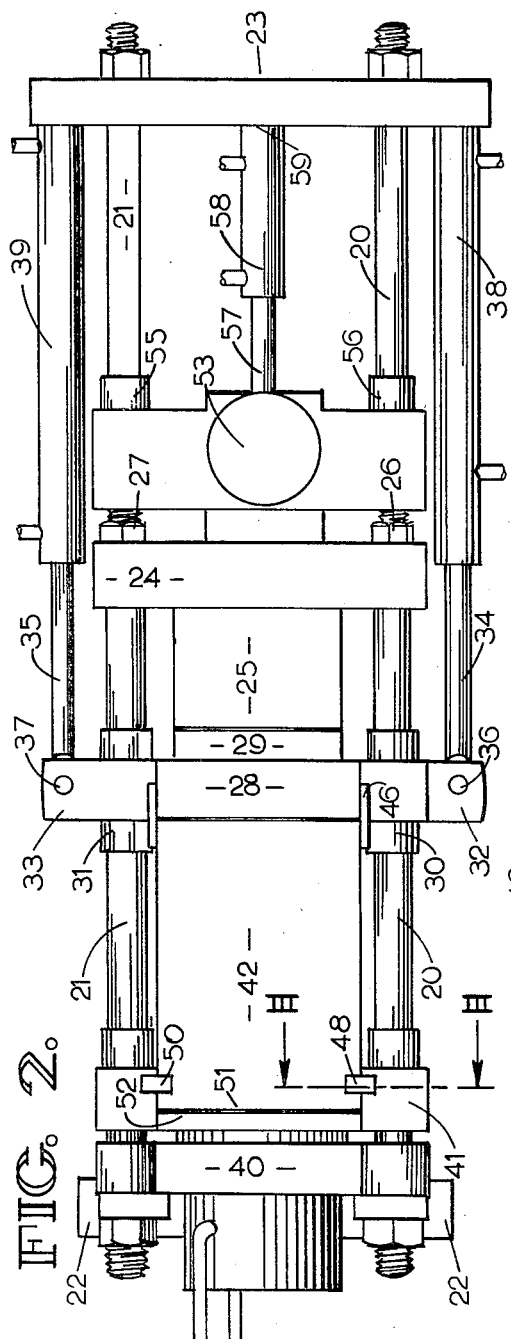
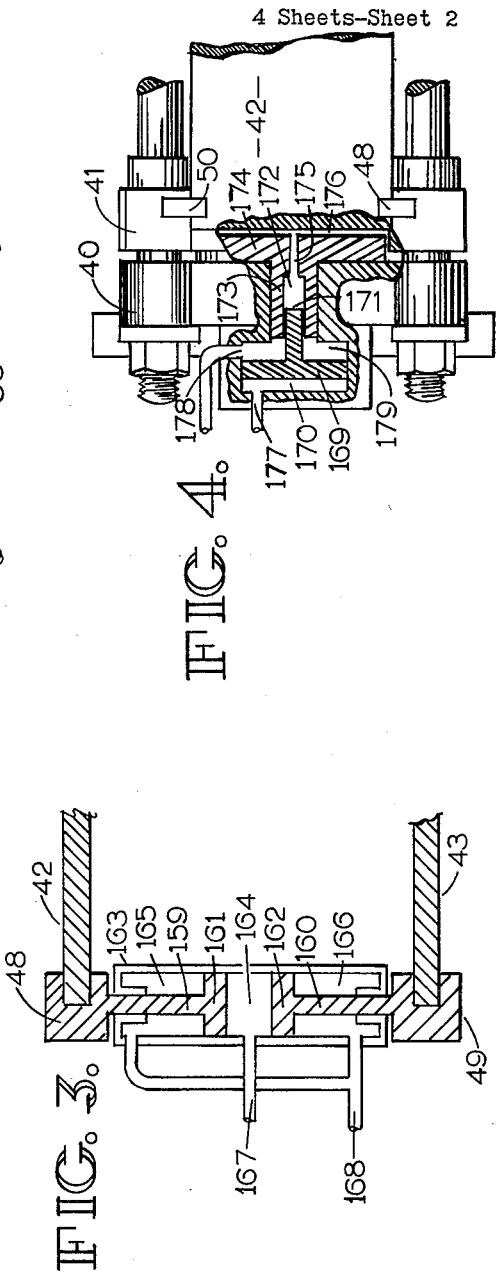
INVENTOR
Raymond J. Poulin

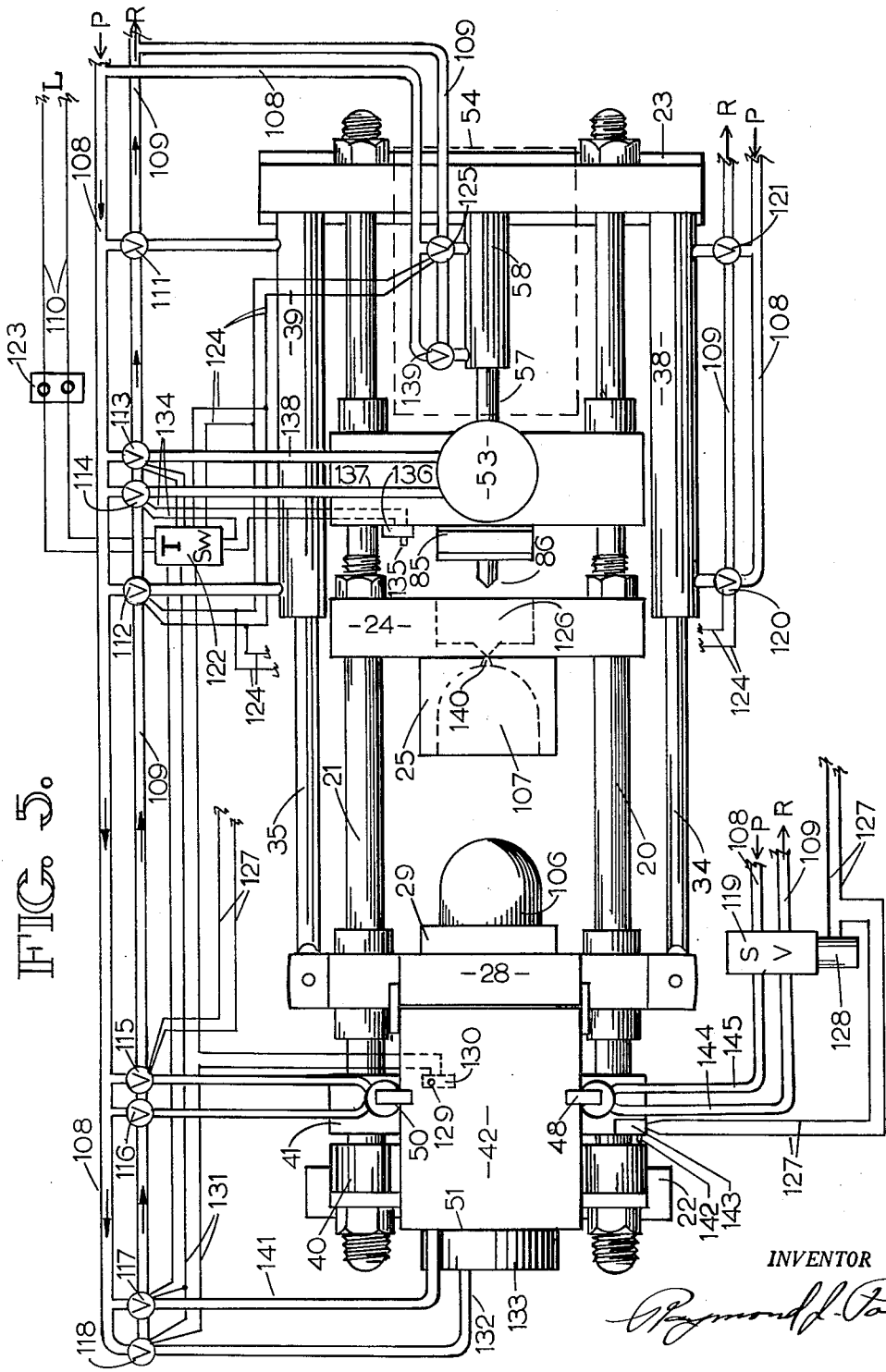

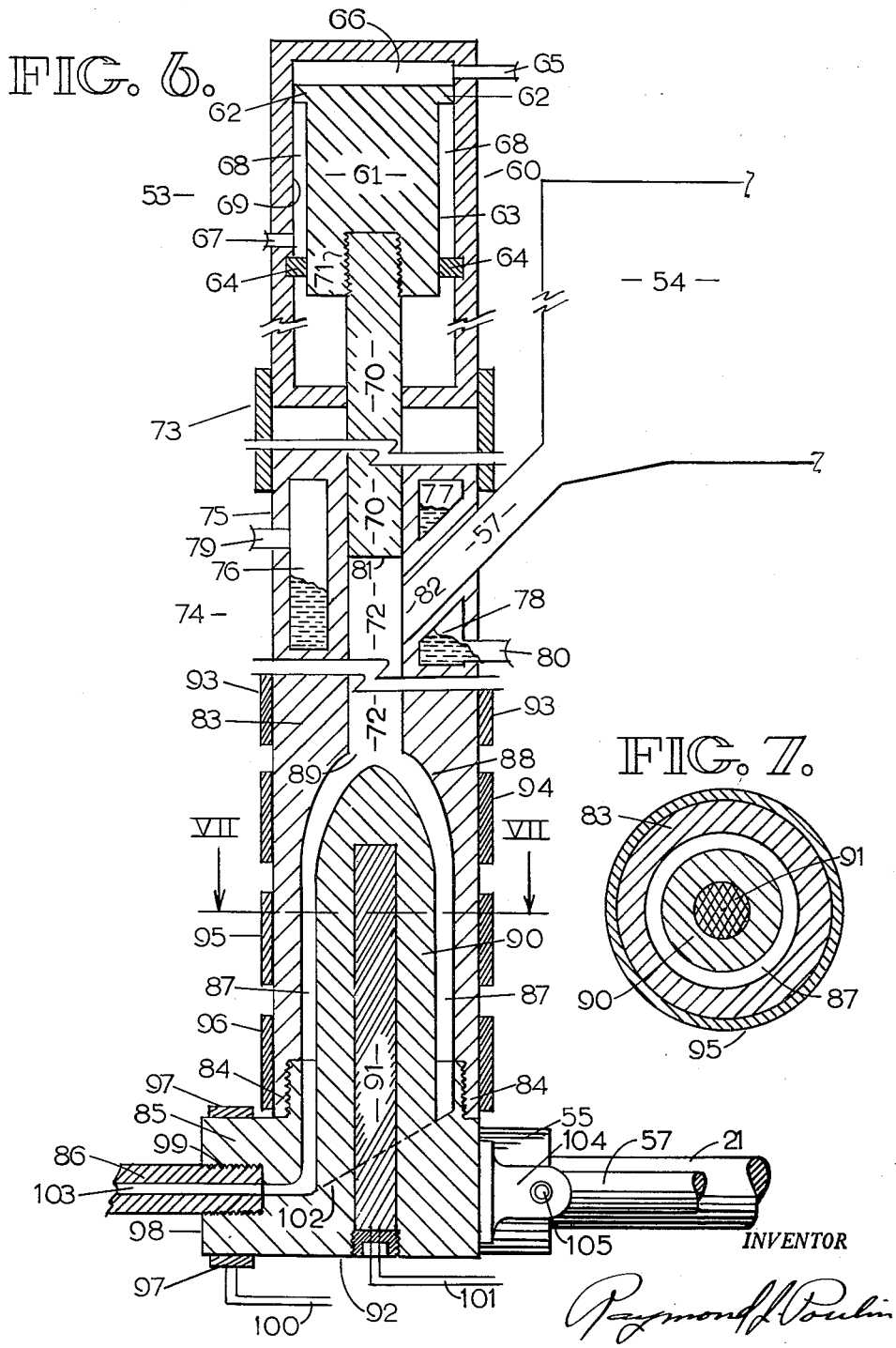

United States Patent Office 3,044,119
Patented July 17, 1962

3,044,119
AUTOMATIC INJECTION MOLDING MACHINES
Raymond J. Poulin, Box 808, Topanga, Calif.
Filed Mar. 12, 1958, Ser. No. 720,980
3 Claims. (Cl. 18—30)

The present invention relates to injection molding machines and, more particularly, to an improved device of this character in which the movable platen and the injection cylinder are both disposed vertically and are adapted for horizontal movement through an extended lineal range by hydraulic means operable by a pressure source of generally low volume and pressure output.

As is generally known within the art, the hydraulic system with which a conventional injection molding machine is operated is required to meet two widely divergent demands during each molding cycle; it must provide a large volume of fluid at moderate pressure to move the operative components of the machine from one position to another and, additionally, it must provide a relatively low fluid volume at comparatively high peak pressures to effect the final clamp up of the mold sections and to drive the injection ram.

Such a sequence of operations requires both a pump of large volume output and a comparatively large motor to drive the pump during the periods of peak pressure output.

Additionally, it has been my observation that the synchronization of mechanical movements together with the control of pressures, temperatures, material supply and the removal of finished parts may be substantially simplified when the injection cylinder is disposed vertically and the major movements of the operating components are performed in a horizontal plane in which it is merely necessary to slide them into and out of engagement, and the lineal movement of the platen and the injection nozzle is great enough to permit the finished parts to drop of their own accord into a bin or onto a conveyor when the molds are separated.

My invention has been made with the foregoing considerations in mind and can be said to have a plurality of important objectives.

One important object of my invention is the provision of an injection molding machine in which the main operating components of the device move in a horizontal rather than a vertical plane.

Another object of my invention is the provision of a device of the character described being adapted in conformation whereby the mold members close and open relative to a vertical plane so that finished parts, when urged by simple ejection means, fall by gravity from between the mold sections.

An additional object of my invention is the provision of a molding device of the character described being adapted in conformation whereby the injection ram and material supply hopper are disposed vertically, and the injection nozzle itself is disposed horizontally.

A further object of my invention is the provision of a device of the character described being adapted in conformation whereby the travel of the movable platen outwardly from the stationary platen is substantially increased compared to conventional machines in order to facilitate the automatic removal of elongate parts from between the mold sections.

An additional object of my invention is the provision of a device of the character described in which the individual elements of the machine are relatively positionable in a wide variety of spacings and ratios of movement whereby parts ranging from a flat plate to a deep conical shell may be molded with equal speed and facility.

A still further object of my invention is the provision of an injection molding device of the character described being adapted to provide maximal flexibility of the relative positioning of its elements and being adapted for fully automatic operation on a minimum of power.

In brief, the injection molding machine of my invention includes an enclosed basal member on which a pair of parallel rigid shafts are horizontally disposed between stationary end plates providing rigid anchorage for hydraulic pistons at one end and a back-up platen assembly at the other end. Positioning means are provided on the shafts for securing a stationary platen between the ends.

A movable platen is suspended on sleeve bearings slidable on the shafts between the stationary and back-up platens. An injection cylinder, with material hopper attached, is also movably sleeve mounted on the shafts and is disposed vertically with its injection nozzle aligning horizontally with and being enterable in an axial aperture in the stationary platen. Two hydraulic pistons serve to slide the movable platen in either direction along the shafts, and a third cylinder moves the injection cylinder along the shafts into and outwardly of the injection position as required in the molding cycle.

The back-up platen assembly is provided with a mechanical interlock with the movable platen and a pressure booster means which is employed to supply the peak pressure necessary to assure tight mating engagement of the male and female mold sections attached respectively to the movable and stationary platens. The machine is further provided with temperature and pressure regulating means, and electrically operated hydraulic valves for actuating sequentially the various movements and time delays involved in the molding cycle and repetitions thereof.

Other important objects of my invention together with numerous possible variations thereof will be apparent in the following specification when examined together with the references contained therein to the accompanying drawings, of which:

FIGURE 2 is a plan view of the machine with a pair of mold blocks installed therein and the various elements disposed in the same relative positioning as shown in FIGURE 1;

FIGURE 3 is a schematic diagram taken along the line and in the direction indicated by the arrows 3—3 in FIGURE 2, showing the operation of the pressure plate lifters;

FIGURE 4 is a fragmentary plan view showing the back-up platen assembly with a portion thereof shown in horizontal section as it would be seen along the line and in the direction indicated by the arrows 4—4 in FIGURE 1, and revealing the operation of the hydraulic pressure booster incorporated therein;

Figure 1:
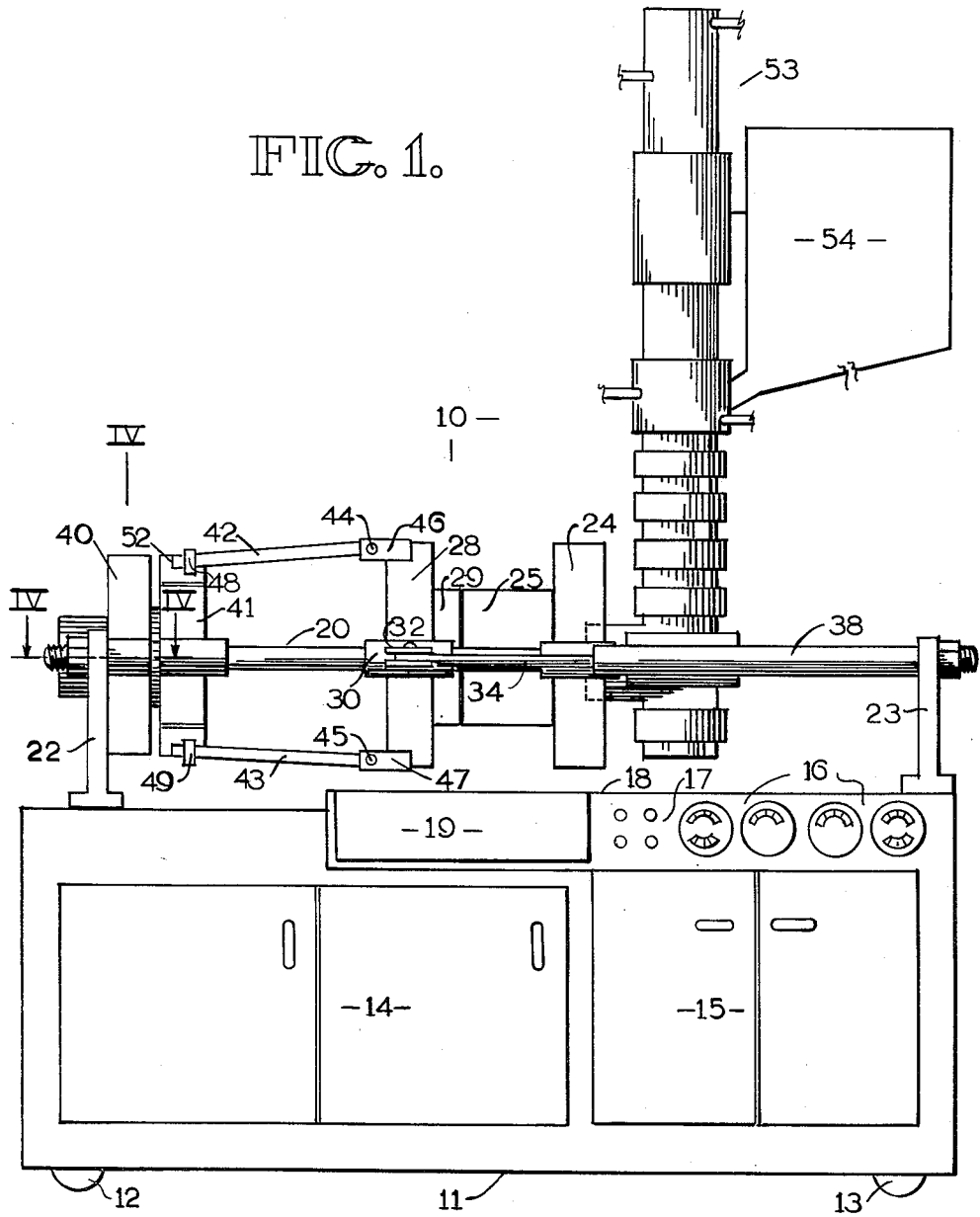
FIGURE 1 is an elevational view of the frontal side of a molding machine constructed according to my invention, showing the various parts of the machine positioned as they would appear with the mold sections closed during the injection phase of the molding cycle.

FIGURE 5 is a plan view similar to that of FIGURE 2 of the molding machine of my invention showing the relative positioning of the elements of the machine when the molds are separated and the injection nozzle withdrawn from the stationary platen; FIGURE 5 also shows schematically the hydraulic lines and electrically operated fluid valves serving the various parts of the machine and actuating their sequential movements during the automatic operation thereof;

FIGURE 6 is a vertical sectional view of the injection cylinder assembly showing the relative positioning of the injection cylinder, ram, supply hopper and inlet duct, spreader cone, heating and cooling elements and the injection nozzle, and FIGURE 7 is a cross sectional view of the injection cylinder taken along the line and in the direction indicated by the arrows 7—7 in FIGURE 6.

Reference is again made to FIGURE 1 which is an elevational view from the frontal or operating side of an injection molding machine constructed according to my invention and designated generally by the numeral 10. As indicated in the figure, the machine 10 is a complete operating unit, movable on its own wheels and operable any place where water and electrical service are available, and includes a rectangular basal cabinet 11 mounted on wheels such as 12 and 13 and having sufficient space interiorly of the doors 14 and 15 to house the fluid pump, sump tank and accessory electrical control equipment, and upwardly thereof a plurality of pressure and temperature indicators at 16 and control buttons at 17.

Disposed centrally of the upper surface 18 of the basal cabinet 11 is a depressed area indicated by the numeral 19 which is adapted to accommodate a bin, chute or conveyor to receive finished parts from the machine.

The various operative elements of the machine are mounted, as will be better understood by reference also to FIGURE 2, on two longitudinally extended shafts 20 and 21 which are received in bores in end plates 22 and 23 shown only in FIGURE 1, the end plates in turn being securely fastened to the upper surface 18 of the basal cabinet 11.

Supported on the shafts 20 and 21 between the end plates 22 and 23 are the pressure platens of the molding mechanism. A normally stationary platen 24 to which a female mold block such as 25 is removably attached is positioned on the shafts 20 and 21 and restrained from movement toward the end plate 23 by means of nuts 26 and 27 as seen in FIGURE 2. A movable platen 28, to which is attached the male mold block 29 of the typical set shown, is provided with sleeve members 30 and 31 which fit slidably on the shafts 20 and 21 and have outwardly extending flanges seen at 32 and 33 to which the piston rods 34 and 35 are attached by the pins means 36 and 37. The piston rods 34 and 35 extend respectively from the pressure cylinders 38 and 39 which are disposed outwardly respectively of the shafts 20 and 21 and are secured to the end plate 23, and as can be understood from FIGURES 1 and 2 serve to slide the movable platen 28 in either direction on the shafts 20 and 21. However, the pressure cylinders 38 and 39 are not depended upon to furnish the peak pressure required to lock the mold members 25 and 29 in closed position, as will be later explained.

A so-called back-up platen assembly is disposed at the ends of the shafts 20 and 21 adjacent the end plate 22 and includes a stationary section 40 which is positioned against the end plate 22 and communicates by means of a booster cylinder with the movable section 41. A pair of planar spacing and pressure plates 42 and 43 is disposed between the movable platen 28 and the movable section 41 of the back-up assembly, and are hingedly attached by means of pins such as 44 and 45 entered through strap members 46 and 47 which extend outwardly and rearwardly from the sides of the movable platen 28.

At their ends spaced from their hinge pins 44 and 45, the pressure plates 42 and 43 are engaged by hydraulic lifters seen at 48 and 49 in FIGURE 1 and in plan view at 48 and 50 in FIGURE 2. When the lifters 48 and 49 are retracted as shown in FIGURES 1 and 2, the end edges of the pressure plates as best seen at 51 in FIGURE 2, engage an opposed surface as indicated at 52 of the platen section 41, thereby locking the movable platen 28 in position relative to the stationary platen 24 and the dies 25 and 29 therebetween as shown in mated closed position in FIGURES 1 and 2.

When the lifters such as 48 and 50 are extended outwardly of the platen section 41, the end edge 51 of the pressure plate 42 is lifted out of engagement with the opposed surface 52 and the plate 42 is enabled to move longitudinally over the upper edge of the platen sections 40 and 41 as the movable platen 28 is pressed toward the platen section 41 to separate the mold blocks 25 and 29.

An injection cylinder, indicated generally by the numeral 53, together with the hopper 54 which is attached to the cylinder and movable therewith, are movably supported on the rods 20 and 21 by means of the sleeve members 55 and 56 best seen in FIGURE 2, and are movable longitudinally of the rods 20 and 21 by relative movement of the piston rod 57 within the hydraulic cylinder 58 which is fixedly attached at 59 to the end plate 23. The particular conformation and internal arrangement of the moving parts and temperature control elements of the injection cylinder assembly 53 is shown in FIGURES 6 and 7 and will be described in detail later.

The operation of the pressure plate lifters designated by the numerals 48 and 49 in FIGURE 1 and at 48 and 50 in FIGURE 2, is shown in detail in the schematic diagram of FIGURE 3 which is a section taken along the line and in the direction indicated by the arrows 3—3 in FIGURE 2.

It should be pointed out that for greater clarity a separate series of reference numerals has been used to designate hidden parts of the hydraulic mechanism in the detailed sections of FIGURES 3 and 4 since neither the parts nor the reference numbers appear in any of the other figures.

Returning to FIGURE 3, the pressure plate 42 is seen to be received in a notch in the lifter 48 and the lower plate 43 in a notch in the lifter 49. The lifters 48 and 49 are formed integrally with the connecting rods 159 and 160 and the piston heads 161 and 162, the latter fitting slidably within the cylinder 163 interiorly of which are three chambers including a central chamber 164 between the piston heads 161 and 162, and end chambers 165 and 166.

The hydraulic ducts 167 and 168 communicate with an electrically operated four-way valve, not shown in the figure, which in turn is connected to the main fluid pressure supply and return lines of the hydraulic system.

As will be readily understood from the diagram, when fluid is admitted through the duct 168 it enters the opposite end cavities 165 and 166 thereby pressing the piston heads 161 and 162 inwardly toward each other and retracting the lifters 48 and 49 to the position in which they appear in the figure. Conversely, when fluid pressure is introduced through the duct 167 into the central chamber 164, both pistons are moved oppositely outwardly thereby extending the lifters 48 and 49 and raising and lowering the pressure plates 42 and 43 respectively so that they may slide rearwardly above and below the movable section 41 and the stationary section 40 of the back-up platen assembly.

The operation of the high pressure cylinder disposed interiorly of the back-up platen assembly, is shown in the fragmentary plan view of FIGURE 4 which is taken from the direction indicated by the single arrow 4, and is broken away to provide a fragmentary sectional view as it would appear along the line and in the direction indicated by the arrows 4—4 in FIGURE 1. A piston 169 is seen to be disposed axially within a pressure chamber 170 and is terminated in a ram portion 171 which is slidable axially within the inner pressure chamber 172 disposed interiorly of the rod 173 connecting with the piston 174. The chamber 172 communicates by means of a duct 175 with the pressure chamber 176 disposed interiorly of the movable section 41. Thus, when fluid pressure is introduced through the aperture 177 into the chamber 170, the piston 169 is moved inwardly of the chamber 170 and the ram portion 171 likewise moves inwardly of the chamber 172 in the arm 173, thereby placing the fluid within the chamber 172 under pressure and forcing it through the duct 175 into the broad pressure chamber 176. Thus, relatively low line pressure is utilized to effect the final clamp up movement of short travel under high pressure.

In this manner movement of the platen section 41 is induced by fluid pressure increased substantially above that which is first admitted through the aperture 177, and pressure imposed upon the section 41 is in turn transmitted through the abutting edges 51 and 52 as seen in FIGURE 2, through the pressure plate 42 to the movable platen 28. At the end of the molding cycle, pressure is diverted by means of a conventional four-way valve as previously explained so that it enters the aperture 178 and the inner area 179 of the cylinder 170 thereby moving the piston 169 outwardly of the pressure chamber 170 and relieving the pressure in the chamber 172 and the resultant tight abutment of the edges 51 and 52.

The arrangement and operation of the injection cylinder assembly which is designated generally in the drawings by the numeral 53, will be readily understood by reference to the vertical sectional view of FIGURE 6 in which the height of the assembly has been reduced disproportionately in order to permit enlargement of various interior details.

As has been previously explained the injection cylinder assembly 53 is slidably disposed on sleeve members such as 55 on the rods 20 and 21 as shown in other views. The hopper 54, which is indicated fragmentarily in FIGURE 6, is attached to and moves with the vertical structure of the injection cylinder assembly 53 which is rigid vertically relative to the horizontal sleeves, such as 55. The assembly 53 includes a basal heating tunnel, a central cooling area 74 communicating with the hopper inlet tube 57 of the hopper 54, and an upper pressure area enclosed within the cylinder 60.

A piston 61 is slidable vertically within the cylinder 60 and is conformed with a head portion of full diameter as indicated at 62 and a body portion of reduced sidewall diameter as indicated at 63 which, in turn, is slidable within the pressure sealing ring 64. An hydraulic pressure conduit opens at 65 through the wall of the cylinder 60 into the chamber 66 above the piston 61, and a second pressure duct 67 opens inwardly of the cylinder 60 into the circumferential space 68 provided between the body wall 63 of the piston 61 and the inner surface 69 of the cylinder 60.

Thus by the use of a four-way valve as previously described, pressure introduced through the duct 65 into the chamber 66 is effective to move the piston 61 downwardly in the cylinder 60 and the injection ram 70 which is threadably attached as shown at 71 to the body of the piston 61, downwardly within the bore 72. Conversely, entrance of fluid pressure through the aperture 67 into the circumferential chamber 68 is effective to move the piston 61 and the injection ram 70 upwardly within the cylinder 60 and the bore 72.

The pressure cylinder 60 is attached by means of a tubular sleeve 73 to the cooling area indicated generally by the numeral 74 which comprises a cast cylindrical section 75 having hollow interior communicating chambers such as are indicated at 76, 77 and 78, through which water or other suitable coolant is circulated through the ingress port 79 and the outlet port 80 adjacent the inlet tube 57 leading from the hopper 54 and opening at 82 into the bore 72.

The cooling area 74 is noteworthy since it serves to isolate the inlet tube 57 from heat which otherwise would be carried upwardly through the circumferential structure of the basal heating area therebelow.

In the position in which it is shown in FIGURE 6 the lower end 81 of the injection ram 70 is at the upper limit of its vertical movement, and is seen to be immediately above the opening 82 of the inlet tube 57 into the bore 72. Hence, it can be seen that the vertical portion of the ram 70 which moves upwardly and downwardly past the opening 82 is as all times entirely confined to the cooled area 74 except for the brief period required for the downward injection stroke. This conformation also minimizes the conduction of heat upwardly into the pressure cylinder 60 through the portion of the ram 70 which moves through the sleeve section 73.

The heating area and tunnel of the assembly 53 includes a cylindrical member indicated generally by the numeral 83 which is threaded as indicated at 84 into the basal section 85 to which the sleeve members such as 55 and the injection nozzle 86 are attached. The cylindrical basal member 83 is interiorly conformed to provide a hollow vertical chamber 87 which is tapered at its upper end through diminished diameters as indicated at 88 to that of the downward opening 89 of the bore 72. A spreader member 90 is integrally formed with and disposed upwardly from the basal section 85 so as to be centered interiorly and coaxially of the vertical chamber 87. The spreader member 90, in turn, is provided with an axial bore in which a rod type heating element 91 is disposed upwardly through the undersurface 92 of the basal section 85.

A plurality of electrical heating bands such as 93, 94, 95 and 96 is disposed circumferentially about basal section 83 and an additional band 97 is disposed around an extended portion 98 of the basal section 85 adjacent its threaded jointure 99 with the injection nozzle 86.

Electrical lead lines serving the heater band 97 and the heating rod 91 are indicated respectively at 100 and 101.

It should be observed that the central basal section 85 of the assembly is conformed so as to provide a downward slope from right to left, indicated by the broken line 102, in the basal termination of interspace 87 between the spreader 90 and the cylindrical housing 83. As will be readily understood, this angular conformation is for the purpose of moving the plastic material within the interspace 87 downwardly toward the bore 103 in the injection nozzle 86. It will be noticed, further, that the interspace 87 between the spreader 90 and the casing 83 is progressively tapered by means of increasing diameters in the spreader 90 to provide a lesser thickness of material adjacent the sloping bottom 102 than near the top of the interspace 87 adjacent its jointure with the bore 72, thereby assuring greater dispersion of the plastic material against and between the heated surfaces defining the cavity.

Also seen in FIGURE 6 is the attachment bracket 104 with which the injection cylinder assembly is pivotally attached, as indicated at 105, to the piston rod 57 which extends from the pressure cylinder 58 as shown in FIGURES 2 and 5.

The general conformation and respective dimensioning of various portions of the lower assembly can be more readily understood by reference to the cross sectional view of FIGURE 7 which is taken along the line and in the direction indicated by the arrows 7—7 in FIGURE 6, showing the external heater band 95 disposed about the casing 83, and the interspace 87 separating the casing 83 from the spreader 90 and the heater rod 91 disposed axially therein.

The operation of the device and the intercooperation of the various mechanical elements thereof will be readily understood by reference to FIGURE 5 which comprises a diagrammatic plan view of the molding machine 10, with the hydraulic and electrical control systems indicated schematically.

In the view of FIGURE 5, the machine 10 is shown with the male and female mold blocks 29 and 25 separated revealing the male mold 106 and the cavity therefor at 107, and with the spacing plate 42 elevated by the lifters 48 and 59 and disposed above the back-up platen sections 40 and 41.

Fluid pressure is supplied by means of a generally conventional hydraulic pump of comparatively low volume and pressure output, the pressure inlet of which is indicated by the arrow P adjacent the main inlet conduit 108 in the upper right hand corner of FIGURE 5, and the return or exhaust outlet is designated by the arrow R pointing outwardly of the return conduit 109. The electrical line supply L is designated by the conductors 110. Both of the conduits 108 and 109 communicate with a plurality of valves such as 111 which direct fluid under pressure to various operating elements of the machine.

It might be stated prefatorially that most of the valves have been shown in FIGURE 5 as single and separate units in order to simplify the explanation of their respective functions, whereas in actual practice during tests of prototype machines it has been found preferable to use electrically operated shuttle valves such as that shown at 119 which is the functional equivalent of any pair of single valves communicating with the same cylinder, such as 113 and 114, 115 and 116, etc. It will also be understood that the pairs of single valves, as shown in the schematic diagram of FIGURE 5, are wired to operate oppositely with one being open to the pressure line while the other is open to the return line, and vice versa.

The molding cycle may be considered to begin with the molds 25 and 29 separated as shown in FIGURE 5. The actuation and sequencing of the various operations of the machine elements is controlled by a generally conventional timing and sequencing switch, designated by the numeral 122, which upon closing of the circuit through the operating switch 123 directs current through the circuit 124 effective to open the valves 112 and 120 to the pressure line 108, thereby admitting fluid under pressure into the outer ends of the cylinders 38 and 39 and causing the piston rods 34 and 35 to move inwardly of their respective cylinders, thus sliding the movable platen 28 along the shafts 20 and 21 and entering the male mold 106 in the cavity 107 and bringing the facing surfaces of the molds blocks 25 and 29 into immediate adjacency.

As will be seen in the diagram of FIGURE 5, energizing the circuit 124 is also effective to open the valve 125 and admit pressure from the line 108 into the inner end of the cylinder 58, thus forcing the piston rod 57 outwardly thereof and moving the injection cylinder assembly 53 along the shafts 20 and 21 and entering the nozzle 86 and the extended section 85 of the assembly 53 into the recess 126 provided interiorly of the fixed platen 24, thus positioning the tip of the nozzle 86 at the desired inlet point, such as 140, and eliminating the formation of a sprue and the subsequent awkward removal thereof in each molding cycle. As has also been shown, the molds are closed and the injection nozzle moved into position at the same time.

As the movable platen 28 is drawn along the shafts 20 and 21 in order to enter the mold 106 in the cavity 107, the upper spacing plate 42 together with the lower spacing plate 43 best seen in FIGURE 1, slide through their respective lifting arms such as 48, 49 and 50 as will be clearly understood by reference to FIGURE 3. The positioning of the stationary platen 24 and the back-up platen on the shafts 20 and 21 is preset so that when the vertical surfaces of the mold blocks 25 and 29 are closely juxtaposed the end edges of the spacing plates such as the edge 51 of the plate 42 is movable inwardly into alignment with the surface 52 best seen in FIGURES 1 and 2 of the movable section 41 of the back-up platen assembly.

When the molds are closed and the edge 51 is positioned as described above, current is directed by the sequencing switch 122 through the circuit 127 to the magnetic coil 128 of the shuttle valve 119 which directs pressure to the opposite end chambers of the cylinder assembly shown in detail in FIGURE 3, current being simultaneously directed through the circuit 127 to the oppositely operating valves 115 and 116 which are shown separately as has been previously explained, causing the plate lifters such as 48 and 50 to move inwardly of their respective cylinders as shown in FIGURE 3, and bringing the ends of the plates 42 and 43 into abutting alignment with the edges such as 52 of the movable section 41 of the back-up platen 40 as is clearly seen in FIGURE 1. At this point the molds are closed and the various components of the machine are relatively positioned as shown in FIGURE 2. However, although the molds are tightly closed, the pressure within the cylinders 38 and 39 is not sufficient to oppose the substantially higher injection pressure and hold the mold sections 25 and 29 together during the injection phase of the molding cycle.

When the spacing plate 42 is moved inwardly by the lifters 48 and 50 as described above, the undersurface of the plate 42 engages the plunger member 129 closing the pressure sensitive switch 130 and arming the circuit 131 directing current to the valve 118. When the circuit 131 is energized by closure of contacts in the sequencing switch 122, the valve 118 is opened to the pressure line 108 and fluid under pressure is directed by the conduit 132 into the high pressure chamber 133 disposed interiorly of and communicating between the back-up platen sections 40 and 41 as shown in FIGURES 4 and 5.

The operation of the pressure boosting cylinder 133 and the manner in which it is enabled to exert an effective pressure against the movable platen section 41 which is many times greater than the available line pressure has been previously explained in connection with FIGURE 4 in which fluid pressure from the conduit 132 is entered through the aperture 177 into the space 170 above the head of the piston 169.

As has also been previously explained, pressure tending to move the movable section 41 away from the stationary section 40 of the back-up platen assembly is transmitted through the spacing plates 42 and 43 to the movable platen 28 to which the male mold block 29 is attached. Very little lineal movement of the platen section 41 and the platen 28 is required in this clamping up process, but a relatively high pressure is needed to hold the facing surfaces of the mold blocks tightly juxtaposed during the injection of the plastic material into the interspace between the male and female mold forms.

Upon completion of the mold clamp up, current is directed by the sequencing switch 122 into the circuit 134 which is armed when the injection cylinder assembly 53 is moved adjacent the stationary platen 24 so that the plunger 135 of the pressure sensitive switch 136 is depressed by engagement with the adjacent vertical surface of the platen 24. Energization of the circuit 134 is effective to open the valve 114 permitting fluid pressure from the line 108 to move through the conduit 137, seen in FIGURE 5, and through the aperture 65 into the pressure chamber 66, best seen in FIGURE 6, of the injection cylinder 53. As is also shown in FIGURE 6, pressure within the upper chamber 66 is effective to move the piston 61 downwardly within the cylinder area 60 and the ram 70 downwardly within the bore 72, thereby forcing plastic material, which has entered the bore 72 through the aperture 82 of the inlet tube 57 opening from the hopper 54, downwardly into the interspace 87 between the tapered spreader member 90 and the cylindrical casing 83, and finally outwardly through the axial bore 103 in the nozzle 86, and thence, as indicated in the diagram of FIGURE 5, into the space between the inner periphery of the cavity 107 and the male mold 106 when entered therein.

A sufficient interval is provided by the timing and sequencing switch 122 for the movement of the plastic into the mold cavity and for sufficient hardening to take place before the reverse sequence of operational movements is begun returning the various parts of the machine from the closed position in which they are shown in FIGURE 2, to the open position with the molds separated, in which they are seen in FIGURE 5.

As will be readily understood, it is possible to complete the operations involved in separating the molds much more rapidly than the closing and injecting sequences described above. When the cooling and hardening interval has elapsed, the direction of the pressure flow is reversed, by means of similar circuitry not shown in the diagram of FIGURE 5, in the oppositely operating pairs of valves and the dual shuttle valve 119. First, the valve 113 is opened to the pressure line 108, thereby admitting fluid pressure through the conduit 138 and the aperture 67 seen in FIGURE 6 of the cylinder section 60 into the lower pressure chamber 68 disposed between the sidewall 69 of the cylinder 60 and the lower circumferential periphery of the piston 61, forcing the piston 61 upwardly and the ram 70 attached thereto upwardly within the bore 72.

The upward movement of the ram 70 establishes a relative vacuum in the bore 72 sufficient to keep the melted plastic material from dripping from the bore 103 in the nozzle 86 and also effective in encouraging the movement of dry granules of plastic from the hopper inlet tube 57 through the aperture 82 into the bore 72. As the upward movement of the injection piston 61 is completed, current is directed to the valve 139 causing it to open to the pressure line 108, while the oppositely operating companion valve 125 is opened to the return line 109, thus inducing pressure in the outer end of the cylinder 58, moving the piston rod 57 inwardly thereof and sliding the injection cylinder assembly 53 away from the stationary platen 24.

Retraction of the injection nozzle 86 from within the cavity 126 interiorly of the platen 24 at this point in the operational sequence is of understandable importance since it permits air to enter through the injection aperture in the platen and in the fixed mold, indicated at 140, thus relieving the internal vacuum and overcoming the general tendency of a convexly conformed molded part to cling to the inner surface of the mold cavity.

Following retraction of the nozzle 86 from the injection aperture 140 of the platen cavity 126, current is directed to the valve 117 opening it to the pressure line 108 and directing pressure through the conduit 141 leading to the cylinder 133 seen in FIGURE 5, and through the aperture 178 opening into the inner pressure chamber 179 disposed inwardly of the piston 169 as shown in the detail view of FIGURE 4, thus relieving the pressure established in the axial chamber 172 and planar chamber 176, and removing the clamp-up pressure transmitted through the abutting edges, such as 52 and 51 in FIGURE 2, and the spacing plates 42 and 43 seen in FIGURE 1, to the movable platen 28 and the mold block 29 attached thereto.

Upon movement of the movable section 41 toward the stationary section 40 of the back-up platen assembly, the plunger member 142 of the pressure sensitive switch 143 is engaged and depressed by the adjacent vertical surface of the section 40, thus closing the switch 143 and arming the circuit 127 relative to the switch 122. Responsive to energization of the circuit 127 by action of the sequencing switch 122, the magnetic coil 128 changes the position of the shuttle valve 119, thereby switching the pressure flow from one to the other of the conduits 144 and 145 seen in FIGURE 5 and directing pressure from the line 109 through the aperture 167, seen in the view of FIGURE 3, into the central pressure chamber 164 of the cylinder 163, thus moving the pistons 159 and 160 and the lifters 48 and 49 attached respectively thereto oppositely outwardly of the cylinder 163 and moving the spacing plates 42 and 43 out of engagement with the respective surfaces such as 52.

Elevation of the spacing plate 42 permits the plunger 129 of the double throw switch 130 to move upwardly and, utilizing circuitry not shown in FIGURE 5 but similar to that previously described, opening the valves 111 and 121 to the pressure line 108 and introducing pressure interiorly of the cylinders 39 and 38 respectively effective to move the piston rods 35 and 34 outwardly thereof, thus sliding the movable platen 28 and the male mold block 29 affixed thereto along the shafts 20 and 21 from the closed position shown in FIGURES 1 and 2 to the open position seen in FIGURE 5.

Conventional means such as compressed air and spring tensioned lifters are employed when necessary to move the finished molded part outwardly of the cavity 107 and away from the outer periphery of the male mold form 106, so that it will drop quickly into the receiving bin 19 seen in FIGURE 1 or onto a conveyor as previously described; thus completing a single molding cycle. After a suitable interval of time which is determined by considerations such as the time required to move the finished parts from between the separated molds and to supplement the supply of plastic material interiorly of the injection cylinder assembly, the sequencing switch 122 again directs current into the circuit 124 thus opening the valves 112 and 120 to the pressure line 108 to move the piston rods 34 and 35 inwardly of their respective cylinders, thereby beginning another operating cycle such as that described in detail hereinbefore.

As has been previously pointed out, the hydraulic system and the electrical control circuitry are generally conventional, and consequently have been illustrated in fragmentary schematic form. It will also be obvious to persons familiar with the art that the molding machine of my invention submits readily to these conventional control methods and presents no inherent problems tending to preclude its fully automatic operation.

In the fully automatic operation of test models certain limit and safety switches, not shown in FIGURE 5, have been employed. In most cases the pressure sensitive switches are of the double throw variety with one pair of contacts serving as a limit switch and the other contacts serving either as an arming or immobilizing means. Each successive movement or operation of the components of the machine must be completed before the next can be started by the sequencing switch, and suitable switching means is provided to stop the machine and the cycling of the sequencing switch if proper synchronization of the machine movements with the respective switch positions is not maintained. Thermal and pressure sensitive restrictive controls are also provided to prevent the operation of the machine before the plastic material is properly pre-heated, or when temperatures or fluid pressures are unsuitable to proper operation.

From the foregoing it will be observed that I have provided an injection molding machine in which the main operating components move in a horizontal rather than a vertical plane, and the mold members open and close relative to a vertical plane so that finished parts, urged by simple ejector means, fall by gravity from between the mold sections.

It will also be observed that in the machine of my invention the lineal travel of the movable platen outwardly from the stationary platen is substantially increased compared to conventional machines, thereby facilitating the removal of elongate parts from between the mold sections.

It will be further noted that I have provided in the device of my invention an injection cylinder and material supply hopper both disposed vertically so that added material may drop readily from the hopper into the heating tunnel, to be later ejected therefrom through a horizontally disposed injection nozzle.

I have also pointed out that the arrangement and positioning of the operative components of the molding machine as described provides maximal flexibility in spacing the components to accommodate variously conformed dies and finished parts, and have shown that the sequential movements of the components of the machine are readily controlled by generally conventional means.

Particular attention is called to the fact that the molding machine of my invention is not only efficient in the automatic production of variously shaped parts, but because of its relatively low pressure and volume outputs requirements, may be operated with a comparatively small pump powered by a proportionately small motor, and therefore constitutes a suitable and desirable contribution to the art.

Although in order to comply with the statute I have shown and described the molding machine of my invention in the form of a preferred embodiment and in considerable detail, it is to be understood that these details are subject to change, and the embodiment is adaptable to numerous variations, and the invention itself is amenable to adaptation into a plurality of embodiments and therefore is not to be limited to the form described herein nor restricted in any manner except as defined in the following claims.

What is claimed is:

1. In an automatic injection molding machine, including a stationary platen having its planar faces disposed vertically and having means for attaching a female mold block to one vertical face thereof, means for injecting plastic molding material interiorly of said female mold block comprising: a pair of parallel shafts extended outwardly at right angles from the face of said stationary platen opposite from said female mold; an aperture disposed centrally of said stationary platen parallel to and between said shafts; an aperture in the side of said stationary platen, said aperture communicating with the cavity in said female mold block and aligning with said aperture in said stationary platen; said aligning apertures being adapted to receive therein a nozzle for injecting molding material; an injection cylinder assembly including a basal section having sleeve members slidable on said shafts, a heating tunnel, an inlet aperture for molding material, a cooling area adjacent said inlet aperture, and a pressure cylinder having a piston therein and a ram movable transversely of said inlet aperture; said injection cylinder assembly being disposed vertically above said shafts, and having a nozzle member extended outwardly horizontally from the basal section thereof, said nozzle member being adapted to be received in said aligning apertures in said stationary platen and said female mold block; and means for applying pressure effective to slide said injection cylinder assembly on said shafts relative to said stationary platen whereby said nozzle is entered into and removed from said aligning apertures before and after the injection of plastic material therethrough by action of said piston ram.

2. The means for injecting molding material as described in claim 1 being further characterized by said aligning apertures and said injection nozzle enterable therein being respectively adapted in conformation whereby the outlet of said nozzle member is positionable at a predetermined point relative to said cavity within said female mold without the use of a conventional sprue hole and the formation of a waste sprue piece.

3. In an injection molding machine, clamping means for holding a pair of molds in tight mated engagement during the injection phase of the injection molding cycle, comprising: a stationary platen having a female mold form affixed to the mounting face thereof; a pressure panel having a pair of upper and lower lifting arms and having a main surface disposed toward and parallel to said face of said stationary platen; a movable platen between said panel and said stationary platen having a main surface disposed toward and parallel to said face of said stationary platen and having a male mold form affixed to said main surface; means for applying pressure effective to move said movable platen adjacent said stationary platen and engage said male mold within said female mold; a pair of rigid spacing plates being generally rectangular in conformation and hingedly attached along one edge to the top and bottom of said movable platen, and being supported edgewise and slidable in grooves in said lifting arms above and below said pressure panel; said spacing plates being adapted to move inwardly of said main surface of said pressure panel when said movable platen is positioned so as to engage said mold forms; means for applying pressure to the side of said pressure panel opposite from said main surface, said pressure being transmitted lineally through said spacing plates to said movable platen and being thereby effective to hold said mold forms in tight engagement during the injection phase of the molding cycle; means for applying pressure effective to extend said lifting arms to move the ends of said spacing plates outwardly of said main surface of said pressure plate whereby said plates are slidable through said grooves in said arms when said mold forms are separated.

References Cited in the file of this patent

UNITED STATES PATENTS

| | | |
|---|---|---|
| 2,262,615 | Lester | Nov. 11, 1941 |
| 2,268,026 | Ernst ea al. | Dec. 30, 1941 |
| 2,738,551 | Howald | Mar. 20, 1956 |
| 2,807,050 | Roger | Sept. 24, 1957 |

FOREIGN PATENTS

| | | |
|---|---|---|
| 905,785 | Germany | Mar. 4, 1954 |
| 786,248 | Great Britain | Nov. 13, 1957 |